(No Model.)
L. P. LAWRENCE.
Pipe and Hose Coupling.
No. 232,279. Patented Sept. 14, 1880.
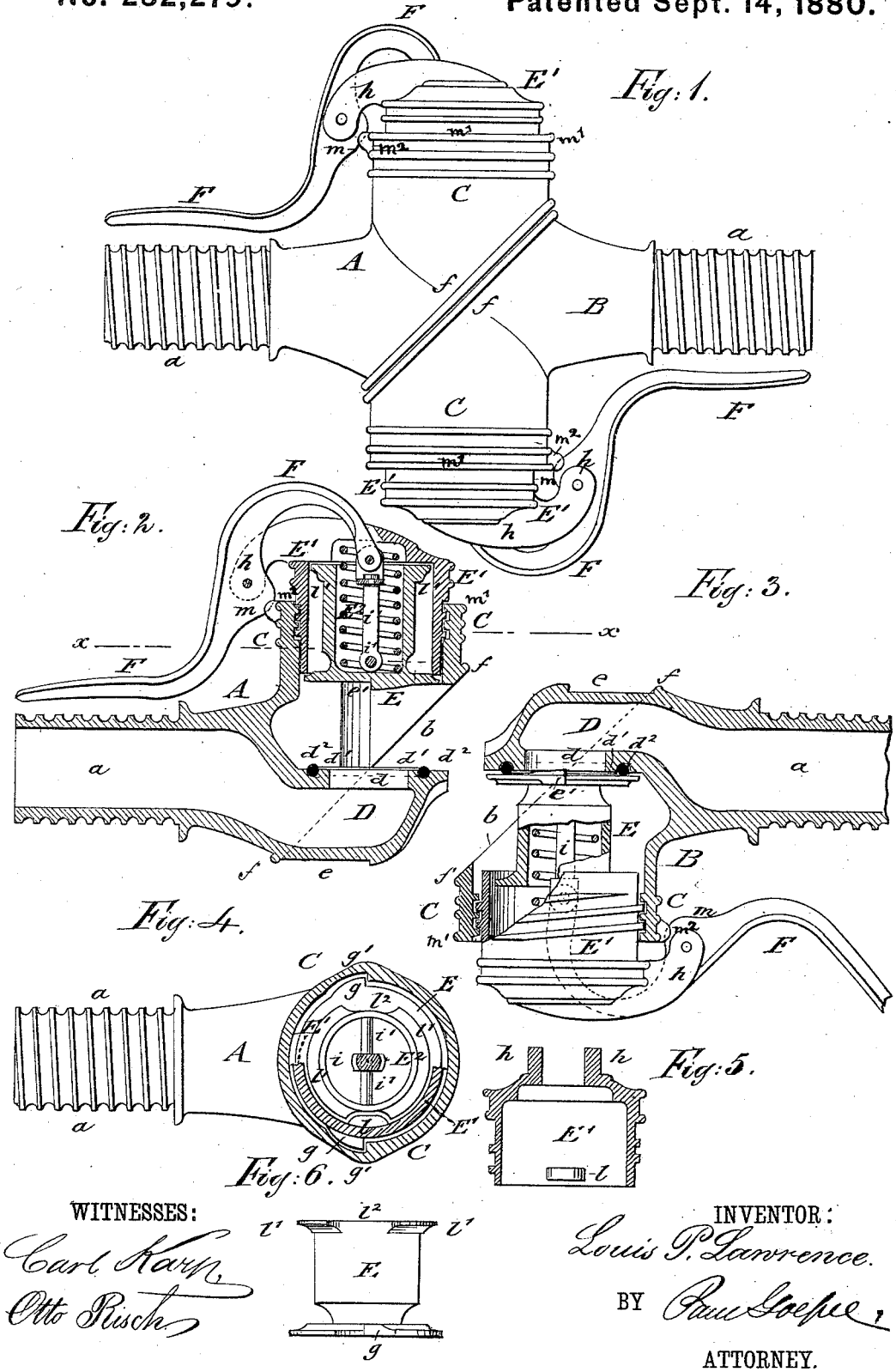
WITNESSES:
Carl Karp
Otto Rusch
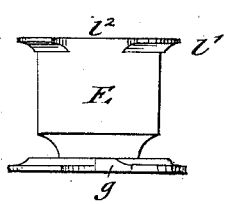
INVENTOR:
Louis P. Lawrence.
BY Paul Goepel,
ATTORNEY.

UNITED STATES PATENT OFFICE.

LOUIS P. LAWRENCE, OF JERSEY CITY HEIGHTS, NEW JERSEY.

PIPE AND HOSE COUPLING.

SPECIFICATION forming part of Letters Patent No. 232,279, dated September 14, 1880.

Application filed June 9, 1880. (No model.)

*To all whom it may concern:*

Be it known that I, LOUIS P. LAWRENCE, of Jersey City Heights, in the county of Hudson and State of New Jersey, have invented certain new and useful Improvements in Pipe and Hose Couplings, of which the following is a specification.

This invention has reference to an improved coupling for steam and air pipes of railroad-cars, for fire-hose, and for similar purposes, as it can be quickly and conveniently coupled and uncoupled, and as either part thereof closes in a perfectly reliable manner as soon as it is detached from the other.

The invention consists of a coupling consisting of two recessed and interlocking parts, each of which has a lower jaw with a valve-seat and a guided and spring-pressed valve-piston, which is operated by a pivot-link and fulcrumed lever from the outside.

The valve-piston is guided in a tubular portion, which is adjustable by a screw-thread in a cylindrical barrel of the section, so that the valve may be rigidly locked on being turned with its guide-tube to its seat or to the interlocking jaw of the other section of the coupling. The under sides of the jaws and valve-pistons are recessed to interlock with each other.

In the accompanying drawings, Figure 1 represents a top view of my improved pipe and hose coupling. Figs. 2 and 3 are horizontal sections of the parts composing the coupling, one part being shown in open and the other in closed position. Fig. 4 is a vertical transverse section through one of the sections of the coupling on line $x\ x$, Fig. 2. Fig. 5 is a detail section of the adjustable guide-tube, and Fig. 6 a detail top view of the valve-piston of each part of the coupling.

Similar letters of reference indicate corresponding parts.

In the drawings, A represents one part, and B the interlocking part, of my improved coupling for steam, water, and air pipes and hose. The shank $a$ of each section is ribbed or threaded for connecting the pipe or hose thereto. Each part is provided with a cylindrical portion or barrel, C, at right angles to the shank, and with a flattened jaw-shaped portion, D, between which and the barrel C an angular recess or opening, $b$, is formed.

The shank, barrel, and jaw are made in one casting of the required size and strength.

The jaw-shaped portion D communicates by a circular opening, $d$, with the shank $a$ of each part, and is surrounded by a valve-seat, $d'$, and by an elastic washer, $d^2$, set into a circular groove, against which a guided and spring-acted valve-piston, E, is forced. The valve-piston E is guided in a cylindrical tube, E', at the inside of the barrel C of each part of the coupling, said guide-tube being connected adjustably to the barrel C by means of a screw-thread.

The under side of each jaw has a transverse notch or recess, $e$, which interlocks with a corresponding transverse projection, $e'$, at the under side of the piston E when the jaw is inserted into the space provided at the interior of the same in the interlocking part of the coupling.

A diagonal rim, $f$, extends around the jaw and the edge of the angular opening $b$ of each part, and forms a contact-stop when the parts are coupled together.

The valve-piston E is guided in the cylindrical barrel C of each part by means of projections $g$ of its valve portion, which enter into corresponding grooves $g'$ of the barrel, for the purpose of preventing any axial motion of the piston, as shown clearly in Fig. 4.

The upper cylindrical part of the piston E is guided by means of an annular rim or collar in the guide-tube E', it being drawn back into the same until its projecting lower part forms contact with the lower edge of the guide-tube and its upper part with the top of the same by means of a curved handle, F, which is fulcrumed to outwardly-projecting lugs $h$ of the guide-tube E', and connected at its inner end by a pivot-link, $i$, to a transverse pin, $i'$, at the lower part of the piston E. A strong spiral spring, $E^2$, is interposed between the top of the guide-tube and the lower part of the valve-piston, and serves to press the latter down when the handle is released, so as to produce the interlocking of the same with the jaw of the connecting part of the coupling, or the tight closing upon its seat.

The outermost end of the fulcrumed handle F of the piston is arranged in close proximity to the shank of each part A B, so that it can be easily grasped therewith by the hand for the purpose of coupling or uncoupling the parts. By pressing the handle toward the shank the piston can be drawn back far enough into its guide-tube so that the parts may be separated.

Whenever a reliable interlocking of the parts or the tight closing of the piston to its seat is desired, the guide-tube E' of the piston is turned axially in the barrel of each part by means of its handle, by which motion interior projecting lugs $l$ at the inside of the guide-tube engage the lower part of the valve-piston E and force it the tighter on the recessed interlocking jaw of the other part of the coupling the more the motion of the guide-tube around its axis is continued, the screw-connection with the barrel C securing the forward motion of the piston. The handle F bears during this motion, by an inwardly-projecting lug, $m$, near its fulcrum, on a rim, $m'$, of the cylindrical barrel C of each part, so as to prevent the rattling of the handle. When the handle is brought back again into its former position in line with the shank the projection $m$ forms contact with a projecting lug, $m^2$. When, however, the valve-piston E is to be locked to its seat the lugs $l$ of the guide-tube E' pass up through notches $l^2$ of an annular rim, $l'$, at the upper end of the tubular part of the valve-piston and press, on turning the handle and guide-tube, down upon the collar, so as to force the lower part of the piston tightly down on its seat. When the handle is returned against the notch $m^2$ the interior lugs, $l$, are in line with the notches $l^2$ of the collar, and admit then the forward motion of the piston by the spring or the drawing back of the same by the handle. By taking hold of both parts and handles and drawing back both pistons the jaws can be inserted into the interior spaces of each part, so that a reliable coupling of the parts is obtained on letting the handles go.

By giving to the guide-tubes of the pistons, by means of the handles, an axial turn the pistons are rigidly and reliably locked to the jaws, so as to prevent thereby any possibility of detaching the parts.

By returning the handles into line with the shanks and lifting the piston sufficiently so that the interlocking shoulders at the under sides of their jaws clear each other, the parts of the coupling can be uncoupled quickly and with great facility.

By the rapidity with which the coupling and uncoupling can be accomplished, as well as by the reliable and intimate interlocking of the parts, the coupling is specially adapted for the air and steam pipes of railroad-cars, for fire-hose, and for applications of a similar nature.

Having thus described my invention, I claim as new and desire to secure by Letters Patent—

1. In a pipe and hose coupling, a one-piece casting composed of a shank, a cylindrical barrel, and a jaw separated from the barrel by an angular recess or opening, substantially as set forth.

2. In a pipe and hose coupling, the combination of a sectional part of the coupling having a cylindrical barrel and a jaw, with interior valve-seat, with a spring-pressed valve-piston guided in the barrel, and with means by which the same is withdrawn from its seat, substantially as set forth.

3. The combination of a recessed sectional part of the coupling having a cylindrical barrel, with an interior spring-pressed valve-piston, with an adjustable guide-tube inclosing the piston, and with means by which the valve-piston is locked to its seat or to the interlocking portion of the coupling, substantially as set forth.

4. The combination of a recessed sectional part of the coupling having a cylindrical barrel, with interior guide-grooves, with a spring-pressed piston having projecting portions at its lower part, and with a fulcrumed handle and pivot-link to withdraw the piston from the seat, as specified.

5. In a pipe and hose coupling, the combination of a sectional part having a cylindrical barrel with an interior spring-pressed piston having a tubular portion with notched top rim or collar, with an intermediate guide-tube having inwardly-projecting lugs and exterior screw-connection with the barrel, and with a handle fulcrumed to the guide-tube and adapted to turn the same so as to lock the piston to the interlocking portion of the coupling or to its seat, substantially as set forth.

6. The combination, in a pipe and hose coupling, of a sectional part having a cylindrical barrel, C, an annular recess or opening, $b$, and jaw D, having a transverse notch at the under side to interlock with the guided and spring-pressed piston of the other part of the coupling, substantially as specified.

7. In a pipe and hose coupling, the interior guided and spring-pressed piston of each part of the coupling, having a transverse projection at its under side to interlock with the transversely-notched portion of the other part of the coupling, substantially as set forth.

8. In a pipe and hose coupling, a sectional part having a cylindrical barrel with a projecting lug and exterior rim, in combination with an interior guide-tube adjustable by a screw-thread within the barrel, and with a handle fulcrumed to the guide-tube, and having a projection near its fulcrum to be stopped when in line with the pipe or hose, and preventing it from rattling in turning the guide-tube, substantially as set forth.

In testimony that I claim the foregoing as my invention I have signed my name, in presence of two witnesses, this 4th day of June, 1880.

LOUIS P. LAWRENCE.

Witnesses:
   ED. S. SIMON,
   PAUL GOEPEL.